United States Patent [19]
Schneider

[11] 3,742,700
[45] July 3, 1973

[54] BALANCE FOR HOROLOGY MOVEMENTS
[75] Inventor: Jean-Claude Schneider, La Chaux-de-Fonds, Switzerland
[73] Assignee: Fabrique d'horlogerie Chs. Tissot et fils S.A., La Locle (Canton of Neuchatel), Switzerland
[22] Filed: Oct. 3, 1972
[21] Appl. No.: 294,509

[30] Foreign Application Priority Data
Oct. 8, 1971 Switzerland.................. 14738/71

[52] U.S. Cl. ................................................ 58/107
[51] Int. Cl. .......................................... G04b 17/00
[58] Field of Search.................... 58/28, 107, 108, 58/110

[56] References Cited
UNITED STATES PATENTS
2,880,570  4/1959  Favret et al............................ 58/107
3,548,586  12/1970  Klinck............................ 58/107 X Primary Examiner—George H. Miller, Jr.
Attorney—Richard K. Stevens, Davidson C. Miller et al.

[57] ABSTRACT

A balance for horology movements including an annular rim and a central part. The central part has a plurality of radially extending, elastically deformable arms which have catches at their ends that lock into corresponding housings in the annular rim. The housings and catches are set so as to insure the centering of the rim with respect to the central part. In alternative embodiments there may be three or four elastically deformable arms and/or the arms may have the housings with the rim having the catches.

8 Claims, 3 Drawing Figures

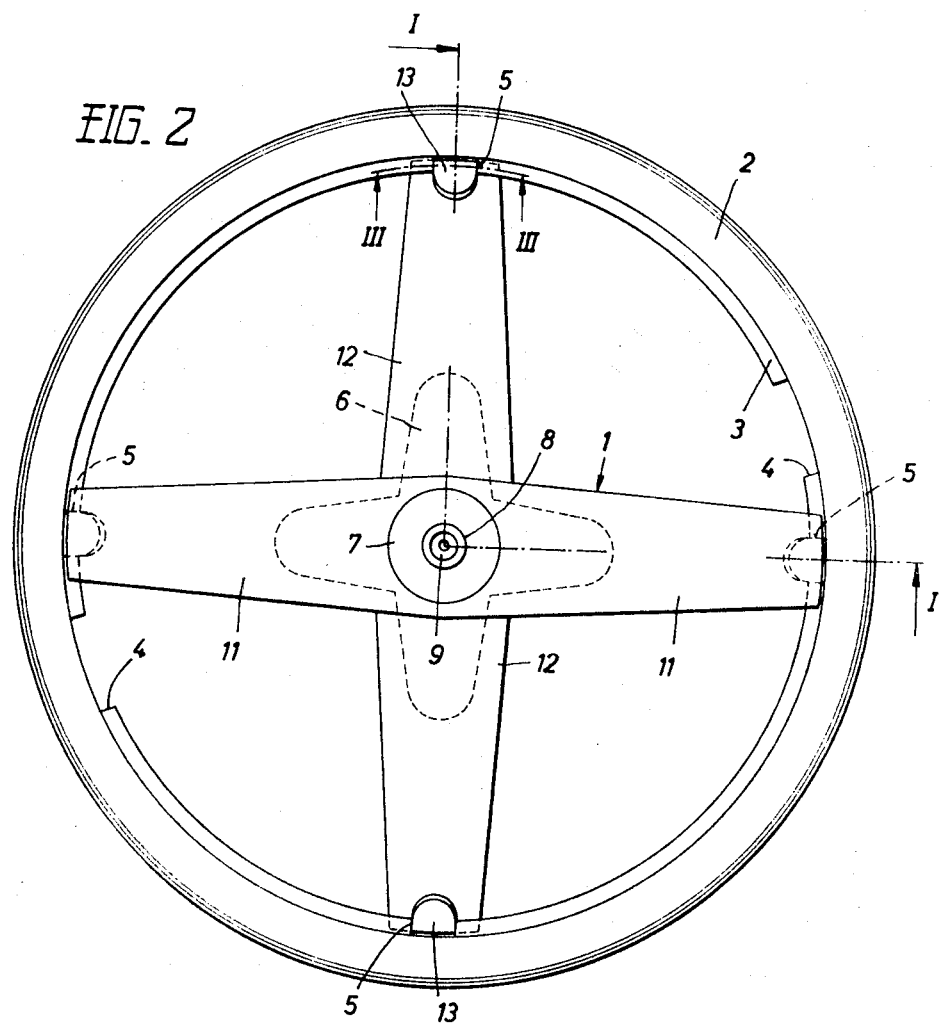

BALANCE FOR HOROLOGY MOVEMENTS

It is known that balance arms and rims for horology movements may be made of several parts assembled one to another. This kind of construction allows one to make use of different materials for different balance parts which materials are selected so that the different parts shall fulfill their roles in the best possible conditions. Thus, it is known how to make balances where the rim or part of the rim consists of a metallic ring whereas the arm and the hub and part of the arbor are made of synthetic material. Balances are also known in which the rim is of a heavy metal and in which the arms are of a conventional metal such as brass.

In order to protect the balance pivot against impacts, constructions have been achieved in which the rim is connected to the hub by one of several arms which may deform elastically. Such constructions allow the rim to move somewhat when subjected to a radial or axial shock and this eliminates excessive overloads on the pivots of the pivoting devices and thus contributes to insure the watch's reliability.

It is clear that if one wishes to manufacture a balance consisting of two organs, i.e., the rim and the central part, and to make use of different substances for the two organs, then it will be necessary to provide an arrangement which allows assembly of these two parts while insuring an absolutely precise centering of the rim with respect to the axis of the central part. Manufacturing central balance parts, that is hubs with radial arms, from a substance which is shaped by molding according to one of the known molding processes, for instance by intrusion, will result in contraction of the substance injected in the mold when cooling. Very costly precautions are required if one wishes to obtain a regularity corresponding to the admissable tolerances for the final length of the arms, if such arms are to be adjusted in length to the dimensions of the rim in order to maintain the rim centered.

The purpose of the present invention is to remedy these difficulties by proposing a balance having two parts, so constructed as to allow for injection of the central part. Also, the present invention allows for assemblage of the two parts, one to another, in a very simple manner without any secondary operations being required, thereby insuring in the end a precise centering of the rim with respect to the axis of the central part.

A further object of the present invention is to achieve, by the means mentioned above, an elastic balance that is capable of at least softening the axial shocks. In order to achieve this object, the present invention comprises a balance for a horology movement having two organs, i.e., an annular rim and a central part comprising at least three radial arms. The two organs are connected one to another by the depths of catches formed on one of said organs in corresponding housings of the other organ, the catches and the housings each providing two parallel lateral sides which are radially oriented with respect to the axis of the central part and which are set with respect to one another so as to insure the centering of the rim with respect to the central part.

The attached drawings illustrate an embodiment of the balance according to the invention.

FIG. 1 is a sectional view along the line I—I of FIG. 2.

FIG. 2 is a top view.

FIG. 3 is a partial sectional view along the line III—III of FIG. 2.

The balance is shown as comprising two organs 1 and 2 which are, respectively, a central part 1 and a rim 2. The rim 2 is a metallic part in annular shape the cross-section of which may be arbitrarily selected but which is provided on its inner face with an annular collar 3 which is bounded by two plane shoulders. The rim 2, as shown in FIG. 2, is interrupted at six locations on its periphery by two diametrically opposite hollows 4 and by four narrower hollows 5 which are oriented at 90° with respect to one another.

One may observe that the inner sides of these hollows are portions of plane surfaces which are parallel to the axis of the rim 2 and which are parallel among themselves, two to two, each of these plane surfaces comprising one of the flanks of two diametrically opposite hollows.

The central part 1 of the specified balance is made of a synthetic substance and is obtained by intrusion. It comprises a central element in the shape of a hub 6 which, on one side, is provided with a frustrum of a cone 7 that extends upwards by means of a cylindrical part 8, and on the other side with four projecting lateral parts forming the branches of a cross with rounded-off ends. The thickness of two of those branches is less than that of the other two. A housing 9 with frustrum-of-a-cone entry terminating into a cylindrical part is fashioned along the axis of central part 1 through the cylindrical part 8 and the frustrum-of-a-cone. On the other side of hub 6 is a cylindrical housing 10 that extends almost to the bottom of housing 9.

Besides hub 6 which was described above, the central part 1 of the balance also comprises four radial arms of which two are two upper arms 11, radially opposite each other, and two lower arms 12, which are also diametrically opposite each other, but are located at a lower level than arms 11. Each of those arms 11, 12 is connected to one of the hub branches. They are of slightly trapezoidal shape in their plane and are larger than the branches of hub 6. Their length in the radial direction is somewhat less than the distance between the axis of rim 2 and the bottom of hollows 4 and 5.

A catch 13 is molded at the outer end of each arm 11 or 12 and its width is adjusted to that of hollows 5. Two of those catches, namely those which are fashioned at the end of each of the arms 12, are directed upwards whereas those which are fashioned at the ends of arms 11 are directed downward.

Each catch 13 is provided with a rounded inner end in the shape of a frustrum-of-a-cone surface, and is bounded on its sides at its end by two plane surfaces which are parallel one to another and to the axis of central part 1. The outer sides of the catches are portions of cylindrical surfaces which are coaxial with the central part 1 and which coincide with the end sides of arms 11 and 12.

It will be understood that assembly of central part 1 and rim 2 for the purpose of making a balance is an extremely simple operation. With the two parts being arrayed one above the other, namely, rim 2 above the central part 1, the ends of the upper arms 11 may be put through the hollows 4 of rim collar 3 so that their catches 13 will pass above this collar. Then, one may impart a rotational motion to central part 1 with respect to rim 2 so that the catches 13 of arms 11 slide on collar 3 while the catches 13 of arms 12 move underneath this collar and will do so until the four catches 13 appear simultaneously opposite one of the hollows 5. Because of the elastic pre-stressing to which arms 11 and 12 were subjected in the axial direction in order to allow engaging the catches 13 on or underneath the collar, each catch 13 penetrates its respective hollow 5. The end portions of each arm 11 and 12, which are located on either side of the corresponding catch 13, will press against one of the shoulders that limit collar 3, as is seen in FIG. 3, and thus connection between the central part 1 and the rim 2 is insured. During injection of central part 1, deviations in length of arms 11 and 12 may be tolerated and are larger than the maximum tolerable error in the centering of the balance rim. This is so because the tolerances regarding the width of catches 13 and their alignment with respect to the axis of the part are extremely small. The centering of the rim depends only on the tolerances obtained from the width of the catches, but not at all on those relating to the length of the arms. This length therefore, may vary without perturbing the centering of the rim. It suffices that the nominal length of the arms be sufficiently less than the distance between the rim axis and the bottom of hollows 5 in order that they will not reach the bottom of these hollows even when the effective length of the arms is longer than the nominal length. When such conditions are obeyed, engaging the catches into the hollows of the rim will assure rim centering.

Those parts of arms 11 and 12 that stretch beyond the hub 6 are of fairly small thickness. Since the central part 1 is made of a synthetic and molded substance such as macrolon, its arms will have some elasticity so that when there is an axial shock they may yield, thereby reducing the axial loads on the journals. The catches 13 are not tied to the rim in the axial direction, therefore, it may be seen that the axial loads are supported only by two of the arms. Thus, in the position shown in the drawing, when axial shock produces a displacement of rim 2 downwards, only arms 12 will yield. Those parts of the rim that surround the catches of arms 11 will move downwards with respect to those catches and will resume their place following the impact. Inversely, the arms 11 will deflect in case of an impact causing rim displacement upwards. The possibilities of deforming the balance therefore are considerably increased. It will be noticed that the movement structure may be so built as to be provided with limit stops on both sides of the rim in order to avoid deformation of excessive magnitudes of the central part in case of violent impact.

In the execution illustrated in the drawing, the balance will be completed by a cylindrical arbor of which one end engages the housing 10 and which supports the collet to which is fastened the inner end of the balance-spring and a stamped part constituting the plate with the roller-pin and the entry for the pallet guard-pin. This stamped part is provided with a cylindro-conical housing such as housing 9. Pivoting of the balance will be insured by two pivoting stems that are fixed with each stem fastened to a component of the structure and which penetrate two cylindro-conical housings that are of similar shape and are located at both ends of the arbor. It is obvious, however, that in other forms of embodiments, the central part of the balance may be assembled upon an arbor which crosses it from one end to the other and which would be provided at both its ends with conventional pivots in fixed journals of known construction.

In lieu of the central part 1 comprising four arms at 90° one from another, the central part may also be formed of three arms which are at 120° one from another. In such a case it would be preferable that the ends of the arms of the central part either engage into slide-guides which are shaped at the periphery of the rim on its inner side, or that they be connected in the axial direction to the inner collar of the rim by parts fitted and fixed to that collar. In this case too, it will suffice that the orientation of the connecting points between the arms of the central part and the rim be precisely determined in order to insure centering the rim. Small variations in arm length wil have no effect.

Another possibility of achieving connection between the arms of the central part and the rim would consist of fashioning hollows corresponding to hollows 5 at the end of the arms and in the shape as shown, and of fashioning catches into the rim that will engage these hollows when assembly is performed.

What is claimed is:

1. A balance for horology movement having first and second organs comprising, respectively, an annular rim; and a central part, having at least three radial arms, wherein one of said organs has catches thereon and the other of said organs has housings, said first and second organs being connected to one another by the penetration of said catches into said housing, each of said catches and housing having two lateral and parallel sides that are radially oriented with respect to the axis of the central part, said catches and housings being set one with respect to the other in such manner as to insure the centering of the annular rim with respect to the central part.

2. A balance according to claim 1 wherein the central part is made of one piece with a component of a balance pivoting device.

3. A balance according to claim 1 wherein the arms of the central part are elastically deformable at least along part of their length in the direction of the axis of said central part.

4. A balance according to claim 3 wherein the central part is made of a plastic substance.

5. A balance according to claim 1 wherein the annular rim is provided with an inner collar having hollows which comprise said housings; and the arms of the central part, having shoulders, are each provided at their outer ends with a catch of a width equal to the hollows of the rim, each such catch projecting from a shoulder that rests upon the collar on either side of the hollows.

6. A balance according to claim 5 wherein the central part further comprises a fourth radial arm, having a catch, all of said arms being perpendicular to each other, and wherein the catches project at the ends of two opposite arms in one direction and at the ends of the other two arms in the other direction, the collar of the rim being limited by two plane surfaces, and the first and second organs being assembled by having two catches penetrate the housings of the rim from the bottom and having the other two catches penetrate the other housings from the top.

7. A balance according to claim 1 wherein the central part comprises three arms oriented at 120° one from another.

8. A balance according to claim 7 wherein the rim is provided along at least part of its inner periphery with sliding elements which engage the ends of the arms and, by locking components, insure the stay of the arm ends in said slides.

* * * * *